United States Patent [19]
Smith et al.

[11] Patent Number: 5,974,186
[45] Date of Patent: Oct. 26, 1999

[54] VIDEO CODING SYSTEM AND METHOD FOR NOISY SIGNALS

[75] Inventors: Mark J. T. Smith; Alen Docef, both of Atlanta, Ga.

[73] Assignee: Georgia Tech Research Corporation, Atlanta, Ga.

[21] Appl. No.: 08/735,659

[22] Filed: Oct. 24, 1996

Related U.S. Application Data

[60] Provisional application No. 60/006,043, Oct. 24, 1995.

[51] Int. Cl.[6] .............................. G06K 9/36; G06K 9/00; H04N 7/12
[52] U.S. Cl. .......................... 382/240; 382/130; 348/413
[58] Field of Search .................................... 382/232, 240, 382/130; 348/390, 398, 413, 427, 434, 699; 341/79

[56] References Cited

U.S. PATENT DOCUMENTS

| | | | |
|---|---|---|---|
| 4,987,480 | 1/1991 | Lippman et al. | 348/396 |
| 5,305,400 | 4/1994 | Butera | 382/107 |
| 5,389,965 | 2/1995 | Kuzma | 348/14 |
| 5,444,550 | 8/1995 | Enokida et al. | 358/453 |
| 5,592,226 | 1/1997 | Lee et al. | 348/413 |
| 5,598,481 | 1/1997 | Nishikawa et al. | 382/130 |
| 5,631,978 | 5/1997 | Galand et al. | 382/240 |

OTHER PUBLICATIONS

Karlsson et al.; Three Dimensional Sub–Band Coding Of Video; IEEE, 1988; pp. 1100–1103.

Koo et al.; Applications Of 2–D And 3–D Compression Algorithms To Ultrasound Images; SPIE vol. 1653 Image Capture, Formatting and Display, 1992; pp. 434–439.

Chen et al.; Three–Dimensional Subband Coding Of Video Using The Zero–Tree Method; SPIE vol. 2727; pp. 1302–1311.

Kim et al.; An Embedded Wavelet Video Coder Using Three–Dimensional Set Partitioning In Hierarchical Trees; IEEE 1997; pp. 251–257.

R. Schaphorst; Video Coding For Low Bitrate Communication; ITU–T Draft H.263; Jul. 5, 1995; pp. 1–48.

Video Codec For Audiovisual Services At p'64 kbit/s; CCITT Recommendation H.261; Dec. 14, 1990.

*Primary Examiner*—Thomas D Lee
*Assistant Examiner*—Wenpeng Chen
*Attorney, Agent, or Firm*—Thomas, Kayden, Horstemeyer & Risley

[57] ABSTRACT

A video coding system and method enable communication of a noisy video signal over communications channels, such as low capacity channels (e.g., telephone lines), by efficiently decomposing the video signal into an underlying structure component and a texture component using subband decomposition. Because much of a texture component is random noise, the texture component lends itself to temporal decimation. This predicament results in a texture frame being encoded and transmitted once every $D_t$ frames and allows texture frames to be sent at a lower rate than underlying structure frames. Because the underlying structure component contains most of the information related to structure, it is decimated in the spatial domain, which allows for maximum data transfer. The texture component and underlying structure component are then coded for transmission over the communications channel, such as a low capacity conventional telephone line, using a method which exploits the characteristic noise and the quasiperiodic nature of the signal.

20 Claims, 3 Drawing Sheets

VIDEO CODING SYSTEM AND METHOD FOR NOISY SIGNALS

This application claims priority to and the benefit of the filing date of and commonly assigned provisional application entitled ULTRASOUND VIDEO CODING SYSTEM AND METHOD, assigned Ser. No. 60/006,043, and filed Oct. 24, 1995.

FIELD OF THE INVENTION

The present invention relates generally to video coding and, more particularly, to a video coding system and method for coding a noisy video signal for transmission over a communications channel, for example but not limited to, a telephone line, an ISDN connection, microwave channel, or acoustic channel. The video coding system and method of the present invention are particularly suited for and will be described in the context of coding an ultrasound video signal; however, the video coding system and method can be used to effectively code virtually any type of noisy video signal.

BACKGROUND OF THE INVENTION

Ultrasound video scanning is a cost effective and preferable method for diagnosing various parts of the human body, including but not limited to, the heart, lungs, kidneys, etc. Ultrasonic scanning entails positioning a probe on the surface of a patient in an area from which the subject part of the body can be scanned, and then scanning the subject area using an ultrasonic signal. The scan signal appears as a video image of the subject anatomy. These images are interpreted by an ultrasound specialist, such as a cardiologist in the case of a heart examination; however, in some geographic areas, a specialist to diagnose the scan image may not be available. In this case, the image is captured on video tape, and a copy is sent to the specialist for diagnosis. This presents a problem if, for example, the scan probe is not optimally positioned during the scan, resulting in an incomplete or undiagnosible image. In that case, the specialist requests an additional scan, thus wasting valuable time and energy.

With the interest and support in telemedicine, the notion of having specialists perform ultrasound examinations at remote locations via electronic data exchange is very attractive. Were the specialist able to view the scan position in real time during the scanning procedure, the specialist could instruct the scan operator on the optimal placement of the scan probe.

In the absence of channel bandwidth constraints, such an approach is straightforward, with high potential benefits related to providing immediate care and lowering overall expense. Unfortunately, many of these remote locations do not have access to high capacity channels, such as T1 lines, to interface with large urban medical centers where such specialists reside.

To achieve successful transmission given the severe constraints on channel capacity, real-time transmission can be performed in a lossy fashion. This means that the real-time images seen by the doctor will have some level of distortion. However, the level of distortion can be made small enough by the system to allow probe positioning to be performed effectively. With the probe in optimal position, a lossless (distortion-free) version of the ultrasound can be transmitted in a non-real-time mode for diagnosis.

Thus, a heretofore unaddressed need exists in the industry for a system and method for permitting high quality transmission of ultrasound signals to thereby facilitate probe positioning and preliminary inspection.

SUMMARY OF THE INVENTION

The present invention provides a system and method for coding and communicating noisy video signals, for example but not limited to, ultrasound video signals. In order to allow video images to be transmitted over a low capacity channel, such as a telephone line, the images should be compressed by approximately 250:1 to 1000:1 to meet the typical compression requirements imposed by telephone line bandwidth limitations. The video coding system and method of the invention can be used to code and communicate a noisy video signal, while accomplishing these coding and compression requirements.

The video coding system and method of present invention will be described in the context of ultrasound video coding, however, any noisy video image, such as synthetic aperture radar, can be efficiently coded using the technique of the present invention. In accordance with the video coding system and method of the invention, an ultrasonic video image is decomposed into a texture component and an underlying structure component using subband analysis. Subband analysis can be accomplished using either linear subband analysis or nonlinear subband analysis. For simplicity, the present discussion will address nonlinear subband analysis to accomplish the signal decomposition. However, linear subband analysis techniques can be used as well. The texture component is then decimated in the temporal, or time domain, while the underlying structure component is decimated in the spatial, or size domain. It should be noted that the foregoing decimation scheme is optimal for ultrasound video coding. There can be other situations where the video coding of the present invention would be optimized by decimating the texture component in the spatial domain and decimating the underlying structure component in the temporal domain, or alternatively, decimating both components in the same domain (spatial or temporal).

Because much of the texture component is random noise and the texture of the tissue in the examined region remains constant for a relatively long period of time, the texture component lends itself to temporal decimation. This results in a texture frame being encoded and transmitted once every $D_t$ frames and allows texture frames to be sent at a lower rate than underlying structure frames. $D_t$ is the temporal decimation factor which determines the number of texture frames sent for every structure frame. Indeed, the present invention allows for transmitting texture frames at a variable rate. Because the underlying structure component is predominantly of low spatial frequency content, it is decimated in the spatial domain which allows for efficient data transfer.

After decimation, the texture component and underlying structure component are then coded for transmission over a low speed channel such as a conventional telephone line.

At the receiver end both the coded texture component and the underlying structure component are reconstructed. The coded decimated texture component is reconstructed by temporally upsampling to restore it back to its original frame rate. The coded decimated underlying structure component is reconstructed by spatially interpolating to restore it to its original size. Nonlinear subband synthesis is then used to recompose the texture component and underlying structure component into an ultrasonic video image.

Another aspect of the present invention is a system and method for reinterjecting a motion component into a temporally decimated texture signal of an ultrasonic video image. In this regard, a displacement vector is obtained from a spatially interpolated underlying structure component. A motion vector is then estimated from this displacement vector and a texture signal is then repositioned using said displacement vector according to a motion field.

The invention has numerous advantages, a few of which are delineated hereafter, as merely examples.

An advantage of the invention is that it allows an ultrasonic image to be transmitted over a low capacity channel, such as a conventional telephone line, so that a specialist can view in real time ultrasound images generated at a remote site and verify the proper placement of an ultrasound probe to ensure an accurate scan image.

Another advantage of the invention is that it allows the effective compression and reconstruction of the large amount of data associated with a noisy video image for transmission over a low capacity channel, such as a low speed telephone line.

Another advantage of the invention is that it enables the separation of a texture component from an underlying structure component of a video image which allows the effective compression and reconstruction of the underlying structure component for transmission over a low capacity channel, such as low speed telephone line.

Another advantage of the present invention is that the operating cost of ultrasonic medical diagnosis can be reduced by replacing the cost of courier service with a couple of long distance phone calls.

Another advantage of the present invention is that it permits efficient coding and compression, storage, and recall of noisy video images.

Other objects, features, and advantages of the present invention will become apparent to one with skill in the art upon examination of the following drawings and detailed description. It is intended that all such additional objects, features, and advantages be included herein within the scope of the present invention, as defined in the appended claims.

BRIEF DESCRIPTION OF THE DRAWINGS

The present invention, as defined in the claims, can be better understood with reference to the following drawings. The components in the drawings are not necessarily to scale, emphasis instead being placed on clearly illustrating principles of the present invention.

DETAILED DESCRIPTION OF THE PREFERRED EMBODIMENT

Figure 1:
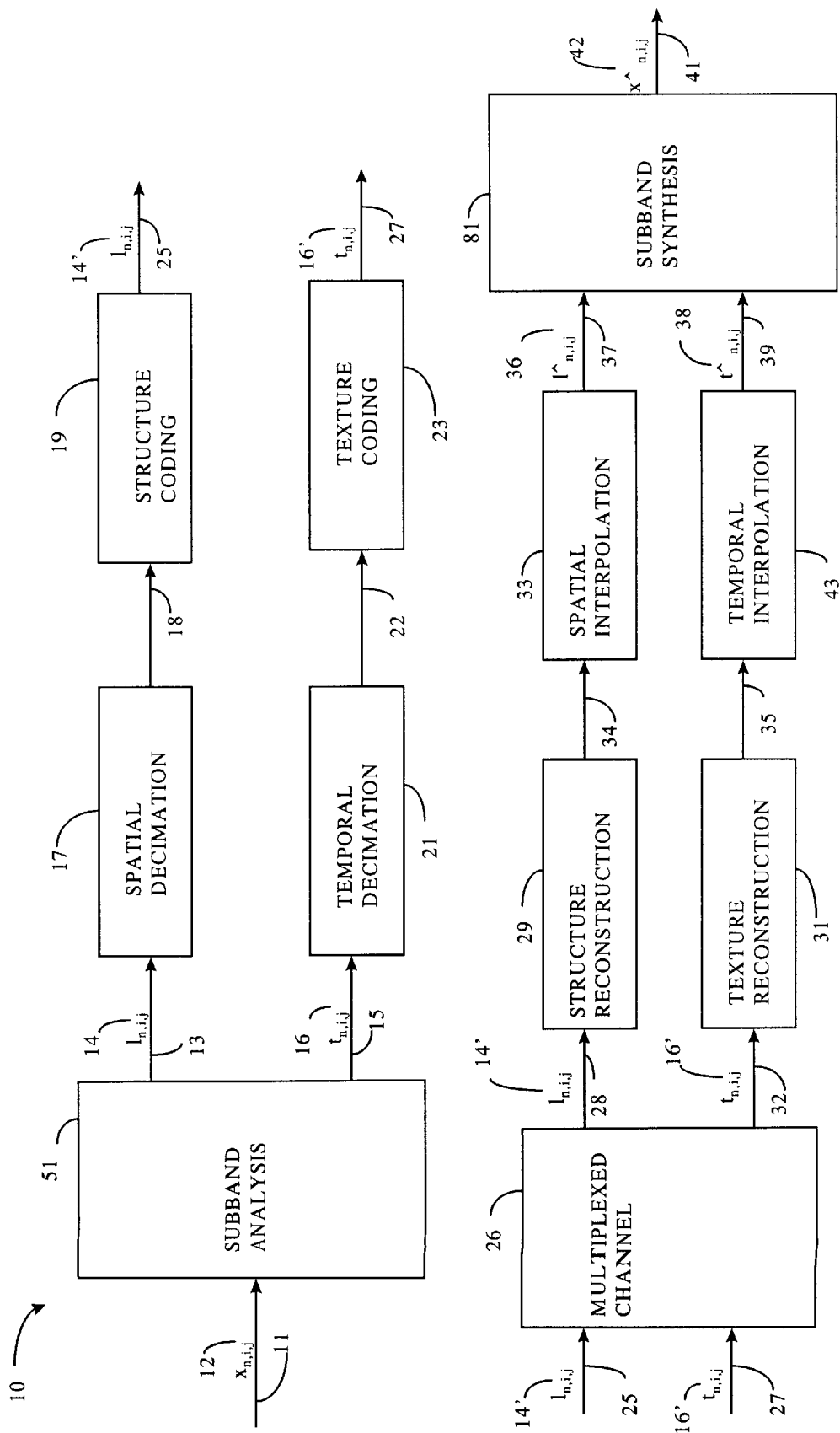
FIG. 1 is a schematic view illustrating the primary components of the video coding system of the invention.

The video coding system and method of present invention will be described in the context of ultrasound video coding; however, any noisy video image can be efficiently coded using the video coding system and method of the invention. With reference now to the figures wherein like reference numerals designate corresponding parts throughout the several views, FIG. 1 is a view illustrating the primary components of the video coding system 10.

ARCHITECTURE

Decomposition, Decimation, and Coding

Input frame $x_{n,i,j}$ 12 is input to a subband analysis device 51. Nonlinear subband analysis device 51 contains logic designed to decompose and filter the input frame $x_{n,i,j}$ 12 into a lowpass underlying structure component $l_{n,i,j}$ 14 and a highpass texture component $t_{n,i,j}$ 16, where n is the frame number, i is the row number, and j is the column number. Subband analysis can be accomplished using either linear subband analysis or nonlinear subband analysis. For simplicity, the present discussion will address nonlinear subband analysis to accomplish the signal decomposition; however, linear subband analysis techniques can be used as well.

Nonlinear subband analysis device 51 will be discussed in greater detail later in this document in the section entitled Subband Decomposition. From the subband analysis device 51, underlying structure component $l_{n,i,j}$ 14 is input to spatial decimator 17, which contains logic designed to reduce the frame to a size which can be efficiently encoded and transmitted over a low capacity channel, such as a telephone line. Texture component $t_{n,i,j}$ 16 is input to temporal decimator 21, which contains logic designed to reduce the frame to a rate which can be efficiently encoded and transmitted over a low capacity channel such as a telephone line. Temporal decimator 21 is a frame downsampler that retains one frame every $D_t$ seconds. This enables the transmission of texture frames at a variable periodic rate.

It should be noted that this decimation scheme is optimal for ultrasound video coding. There can be other situations where the video coding of the present invention would be optimized by decimating the texture component in the spatial domain and decimating the underlying structure component in the temporal domain, or alternatively, decimating both components in the same domain.

Underlying structure component $l_{n,i,j}$ 14 is then encoded by structure coder 19 and, texture component $t_{n,i,j}$ 16 is encoded by texture coder 23. Any suitable coding techniques may be used to code the structure and texture in respective coders 19, 23, many of which are well known in the art.. For example, the subband coding system and method as described in A. Docef, F. Kossentini, W. Chung, and M. Smith, "Multiplication-free subband coding of color images" in *Data Compression Conference*, (Snowbird, Utah, U.S.A.), Mar. 1995 and F. Kossentini, M. Smith, and C. Barnes, "Entropy-constrained residual vector quantization," in *Proc. IEEE Int. Conf. Acoust., Speech, and Signal Processing*, vol. V, (Minneapolis, Minn., U.S.A.), pp. 598–601, Apr. 1993 can be used to encode the underlying structure component $l_{n,i,j}$ 14 as well as the texture component $t_{n,i,j}$ 16. Alternatively, H.263 or MPEG video coders could be used for structure coding, for example, and JPEG or vector quantization based coders could be used for texture coding.

The coded underlying structure component $l_{n,i,j}$ 14' and the coded texture component $t_{n,i,j}$ 16' are then multiplexed onto a narrowband low capacity channel, such as a telephone line, represented by channel block 26 for transmission.

At the receiver, underlying structure component $l_{n,i,j}$ 14' is reconstructed by structure reconstruction logic 29 which contains logic designed to decode the encoded underlying structure component $l_{n,i,j}$ 14'. Similarly, texture component $t_{n,i,j}$ 16' is reconstructed by texture reconstruction logic 31 which contains logic designed to decode the encoded texture component $t_{n,i,j}$ 16'. The underlying structure component $l_{n,i,j}$ 14' is then upsampled and spatially interpolated by spatial interpolation logic 33 which is designed to restore the underlying structure component $l_{n,i,j}$ 14 to its original frame size, where it is input as $l'_{n,i,j}$ 36 to nonlinear subband synthesizer 81. Texture component $t_{n,i,j}$ 16' is then reconstructed using motion vectors extracted from $l_{n,i,j}$ 14, using interpolation logic 43 which is designed to restore the texture component $t_{n,i,j}$ 16 to its original frame rate, where it is input as $t\hat{}_{n,i,j}$ 38 to nonlinear subband synthesizer 81. Alternately the texture component is reconstructed using synthesized texture frames or texture templates. Nonlinear subband synthesizer 81 contains logic designed to recompose the underlying structure component $l\hat{}_{n,i,j}$ 36 and texture component $t\hat{}_{n,i,j}$ 38 into output frame $x\hat{}_{n,i,j}$ 42. Its operation will be discussed in the section entitled Subband Decomposition.

Subband Decomposition

For simplicity, this section will address subband decomposition in the context of nonlinear subband decomposition; however, any subband decomposition technique, such as linear subband decomposition, can be employed as well to decompose a video image. At the transmitter, the input frame $x_{n,i,j}$ 12 is decomposed and filtered using nonlinear subband analysis device 51 which contains logic designed to decompose an input frame $x_{n,i,j}$ 12 into an underlying structure component $l_{n,i,j}$ 14 and a texture component $t_{n,i,j}$ 16. At the receiver, the underlying structure component $l\hat{}_{n,i,j}$ 36 and the texture component $t\hat{}_{n,i,j}$ 38 are recomposed into an output frame $x\hat{}_{n,i,j}$ 42 using nonlinear subband synthesis device 81.

Figure 2:
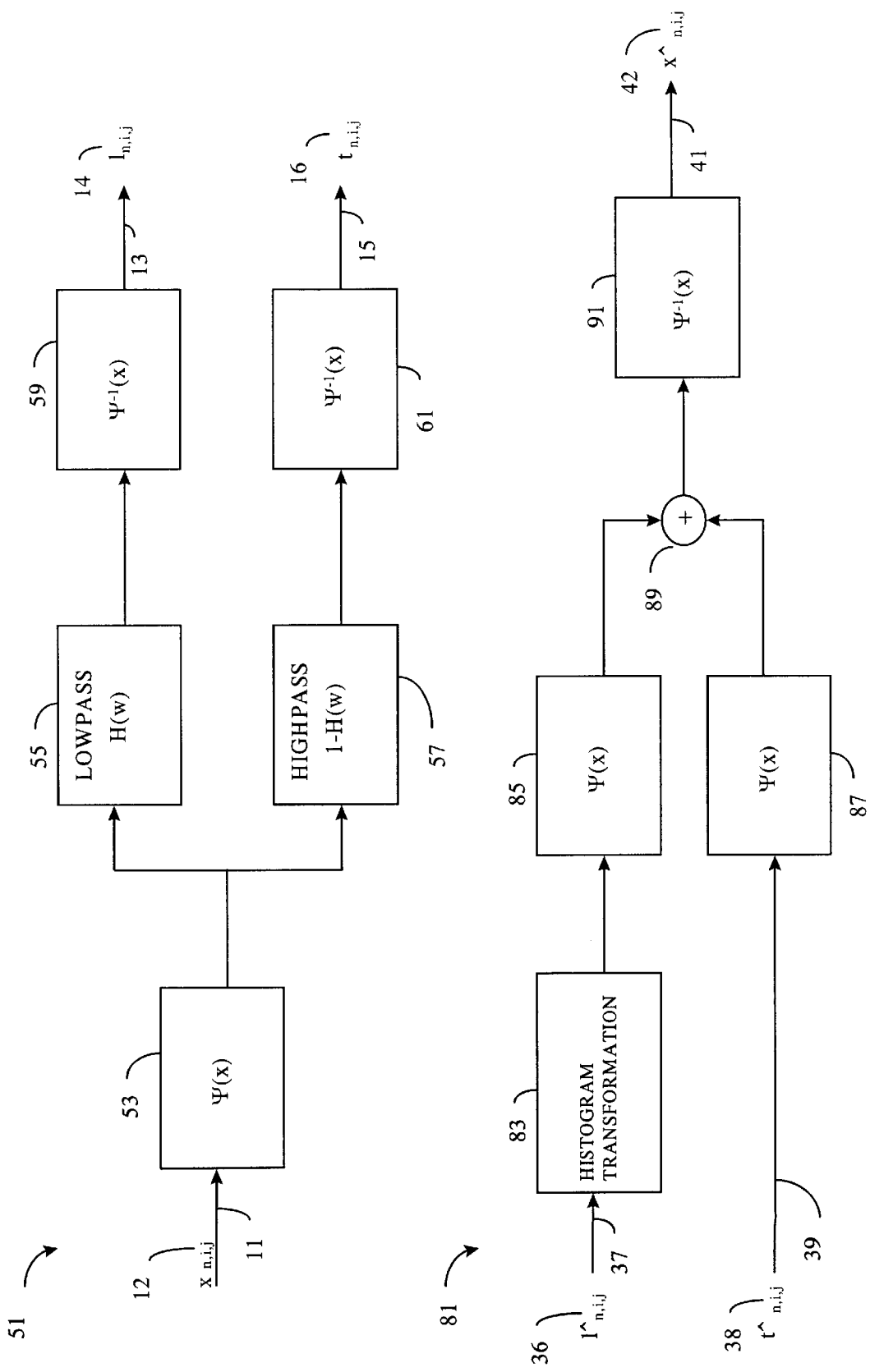
FIG. 2 is a schematic view illustrating the components of the decomposition and recomposition subsystems of FIG. 1.

Referring now to FIG. 2, at the transmitter or analysis end, input frame $x_{n,i,j}$ 12 is input to an amplitude warping device 53 having the form of, or properties similar to the function $\psi(x) = \beta x^\alpha$ where $\beta$ and $\alpha$ are preselected constants. The output of the amplitude warping device 53 is then passed to lowpass filter 55 which contains logic designed to attenuate high spatial frequencies and retain low spatial frequencies. The signal from lowpass filter 55 is then input to the inverse amplitude warping device $\psi^{-1}(x)$ 59 which contains logic designed to remove the effects due to amplitude warping device 53, thus producing underlying structure component $l_{n,i,j}$ 14 for input to spatial decimator 17.

Concurrently, the output of the amplitude warping device 53 is also input to highpass filter 57 which contains logic designed to attenuate low frequencies and retain high frequencies. The signal from highpass filter 57 is then input to inverse amplitude warping device 61 which contains logic designed to remove the effects due to amplitude warping device 53, thus producing texture component $t_{n,i,j}$ 16 for input to temporal decimator 21.

Conversely, at the receiver or synthesis end, underlying structure component $l\hat{}_{n,i,j}$ 36 is input to an optional histogram transformer 83 which contains logic designed to perform a nonlinear histogram modification which can (if so desired) be used to enhance the subjective quality of ultrasound. The signal is then input to the amplitude warping device 85 which contains the same logic contained in amplitude warping device 53. Texture component $t\hat{}_{n,i,j}$ 38 is processed by amplitude warping device 87 which contains logic identical to that in 85 and 53. Underlying structure component $l\hat{}_{n,i,j}$ 36 and texture component $t\hat{}_{n,i,j}$ 38 are then summed by adder 89 resulting in a composite texturestructure sequence of frames. This frame sequence is then input to inverse amplitude warping device 91 which contains logic identical to that in 59 and 61, and supplies output frame $x\hat{}_{n,i,j}$ 42 which can be analyzed by an ultrasound specialist.

The elements of the video coding system, as described previously, can be implemented in software, firmware, hardware, or a combination thereof.

When implemented in software, the video coding and decoding system can be stored and transported on any computer readable medium for use by or in connection with a computer-related system or method. In the context of this document, a computer readable medium is an electronic, magnetic, optical, or other physical device or means that can contain or store a computer program for use by or in connection with a computer-related system or method.

OPERATION

Decomposition

Referring back to FIG. 1, input frame $x_{n,i,j}$ 12 is input on channel 11 for decomposition using nonlinear subband analysis device 51, the operation of which will be discussed in greater detail in the section entitled Subband Decomposition. Input frame $x_{n,i,j}$ is decomposed nonlinearly into two components. An underlying structure component $l_{n,i,j}$ 14 on channel 13 and a texture component $t_{n,i,j}$ 16 on channel 15, where n is the frame number, i is the row number and j is the column number. Texture component $t_{n,i,j}$ 16 on channel 15 contains information regarding the texture of the tissue being examined and a large amount of noise. The decomposition is based on a signal model and is optimized empirically such that underlying structure component $l_{n,i,j}$ 14 on channel 13 contains most of the information needed for diagnosis, such as the contours of the organ walls and internal orifices.

Decimation and Coding

After decomposition using nonlinear subband analysis device 51, underlying structure component $l_{n,i,j}$ 14 on channel 13 is spatially decimated 17 in i and j to the Nyquist rate, which reduces the frame to a size which can be efficiently coded and transmitted over a low capacity channel such as a telephone line, and output on channel 18. Signal coding 19 is then performed using an efficient image sequence coder, such as H.263, MPEG, motion JPEG or the subband coding method described in A. Docef, F. Kossentini, W. Chung, and M. Smith, "Multiplication-free subband coding of color images" in Data Compression Conference, (Snowbird, Utah, U.S.A.), Mar. 1995 and F. Kossentini, M. Smith, and C. Barnes, "Entropy-constrained residual vector quantization," in *Proc. IEEE Int. Conf. Acoust., Speech, and Signal Processing*, vol. V, (Minneapolis, Minn., U.S.A.), pp. 598–601, Apr. 1993. Coded underlying structure component $l_{n,i,j}$ 14' is then output on channel 25.

Underlying structure component $l_{n,i,j}$ 14 can be represented well as a spatially decimated image because it was created by lowpass filtering in both horizontal and vertical directions, where the filter cutoff frequency is $\pi/D_1$. Therefore, underlying structure component $l_{n,i,j}$ can be downsampled by $D_1$ in both horizontal and vertical directions without loss of information due to aliasing. Since the amplitude warping device $\psi(x)$ is one to one, underlying structure component $l_{n,i,j}$ can be decimated and reconstructed. Coding the decimated versions of $l_{n,i,j}$ and $t_{n,i,j}$ permits the net bit rate to be reduced dramatically, thus allowing transmission over low capacity channels such as telephone lines.

After decomposition, texture component $t_{n,i,j}$ 16 on channel 15 is temporally downsampled by temporal decimator 21, which reduces the rate to one that can be efficiently coded and transmitted over a low capacity channel such as a telephone line, and output on channel 22. Texture coding 23 is then performed using an efficient still frame coding technique such as subband image coding as described in A. Docef, F. Kossentini, W. Chung, and M. Smith, "Multiplication-free subband coding of color images" in *Data Compression Conference,* (Snowbird, Utah, U.S.A.), Mar. 1995 and F. Kossentini, M. Smith, and C. Barnes, "Entropy-constrained residual vector quantization," in *Proc. IEEE Int. Conf. Acoust., Speech, and Signal Processing,* vol. V, (Minneapolis, Minn., U.S.A.), pp. 598–601, Apr. 1993, or JPEG for example. Coded texture component $t^\wedge_{n,i,j}$ 16' is then output on channel 27.

Texture component $t_{n,i,j}$ 16 is then transmitted only once every $D_t$ frames. This is done because the texture of the tissue in the examination region remains constant for a relatively long period of time. At the receiver, the same decoded texture component is used for the synthesis of consecutive texture frames. For large values of $D_t$, this method may produce an unpleasant effect of static texture. To reduce this effect and to have a more subjectively realistic decoded video sequence, two methods are presented for temporal interpolation 43.

In the first method, the system alternates between two received texture frames every 1/30 seconds. However, the texture frames are only transmitted every $D_t/30$ seconds where $D_t > 1$ (assuming a 30 frame/second frame rate). This approach is simple but results in a noticeable flicker effect. The flicker can be reduced by switching between the texture frames at a slower rate, such as every two or three 1/30 second frame periods. This results in texture frames being stored in a receiver.

In the second method for temporal interpolation the system alternates between a stored temporally decimated texture frame and a synthesized texture frame, using the well-known technique of motion compensation prediction. However, unlike the conventional case, all motion vectors are estimated at the receiver end from the underlying structure component $1^\wedge_{n,i,j}$ 36 on channel 37. Standard block matching algorithms can be used for the motion vector estimation. The motion vectors are scaled up spatially (i.e. spatially interpolated) so that they represent motion for frames of the original input size. These motion vectors are then applied to the texture component to produce a motion compensated prediction of the texture. The texture components used can be either transmitted periodically as described, and stored in memory at the receiver, synthesized at the receiver using a texture synthesis algorithm, or created at the receiver using a texture template from a stored set of texture templates. A texture synthesis algorithm is any algorithm or program that generates texture patterns. Some examples are random noise generators, all-pole model based texture generation algorithms, and fractal texture algorithms. With this formulation, the texture is always in synchrony with the movement in the structure and the results appear close to the original.

Block matching motion estimation is a simple popular technique used to model the motion of objects present in an image sequence. This technique approximates a frame in the sequence by using rectangular blocks of pixels present in the previous frame. A motion vector field is first computed from the reconstructed structure as follows. For each N×N pixel block in a reconstructed structure frame, a corresponding N×N pixel block is found in the previous frame that best approximates the current block, preferably according to a minimum mean amplitude difference (MAD) criterion. The MAD is defined as the mean of amplitude differences between the two blocks of pixels. Then a motion vector is computed that measures the displacement of the current block relative to the corresponding block in the previous frame. Each motion vector has a horizontal and a vertical component. The set of motion vectors computed for an entire frame is the motion vector field of that frame.

The computed motion field is then used to obtain a sequence of $D_t$ texture frames from a single texture frame. This is realized by applying the motion information extracted from the structure frames to the single texture frame as follows. First, each motion vector is multiplied by $D_1$ to account for the difference in size between the structure and image frames. The structure frame is decimated to $D_1$ both horizontally and vertically. Then, to obtain the frame following the single received texture frame, it is tiled with blocks from the received texture frame as follows: each $(D_1 \times N) \times (D_1 \times N)$ pixel tile is filled with the pixels in the corresponding $(D_1 \times N) \times (D_1 \times N)$ pixel block in the received frame according to the motion vector associated with the tile. This process is repeated for all $D_{t-1}$ pairs of consecutive texture frames.

Transmission

The encoded underlying structure component $1_{n,i,j}$ 14 on channel 25 and the encoded texture component $t_{n,i,j}$ 16' on channel 27 are time multiplexed onto a narrowband low capacity channel, for example, a telephone line represented by channel block 26, for transmission to a remote location.

Decoding and Interpolation

At the receiver, the channel signals are demultiplexed by channel block 26. Underlying structure component $1_{n,i,j}$ 14' appears on channel 28 and texture component $t_{n,i,j}$ 16' appears on channel 32. Underlying structure component $1_{n,i,j}$ 14' on channel 28 is reconstructed by reconstruction logic 29 and is supplied on channel 34 to spatial interpolator 33 where it is upsampled and spatially interpolated to restore it to its original size, where it is output as underlying structure component $1_{n,i,j}$ 36 on channel 37 for nonlinear subband synthesis 81. Texture component $t_{n,i,j}$ 16' on channel 32 is reconstructed by reconstruction logic 31 and is supplied on channel 35 to temporal interpolator 43 where it is upsampled and temporally interpolated to its original frame rate, where it is output as texture component $t^\wedge_{n,i,j}$ 38 on channel 39 for nonlinear subband synthesis 81.

Subband Decomposition

Two particular characteristics of the ultrasound video signal support the idea of using model based decomposition. First, if static tissue is examined, the ultrasound image can be interpreted as the product of a luminance lowpass component, representing the intensity of the ultrasonic wave in the vicinity of the examined tissue, and a constant reflectance component representing the reflection coefficients associated with the tissue.

Second, ultrasound images are typically very noisy. Typically, additive noise models are used to describe the effect of noise in images. Filtering out the noise could enhance the images, but more importantly, it makes the image easier to code. If the noise has a Gaussian distribution, then a linear filter is optimal for maximizing the signal-to-noise ratio. In this case, the goal is to maximize the subjective quality of the lowpass component. Thus, two approaches can be considered: an additive model and a multiplicative model. A model formulation that covers both additive and multiplicative varieties is illustrated in FIG. 2.

Referring now to FIG. 2, shown is a view illustrating the components of the decomposition 51 and recomposition 81 subsystems. At the transmitting or analysis end, input frame $x_{n,i,j}$ 12 is input on channel 11 to amplitude warping device 53, which warps the amplitude values of $x_{n,i,j}$ 12. The output is directed to lowpass filter 55 and to highpass filter 57. The signal from the lowpass filter 55 is then operated upon by inverse amplitude warping device 59, producing underlying structure component $l_{n,i,j}$ 14 on channel 13 for input to spatial decimator 17 of FIG. 1. The signal from highpass filter 57 is then operated upon by inverse amplitude warping device 61, producing texture component $t_{n,i,j}$ 16 on channel 15 for input to temporal decimator 21 of FIG. 1.

Figure 3:
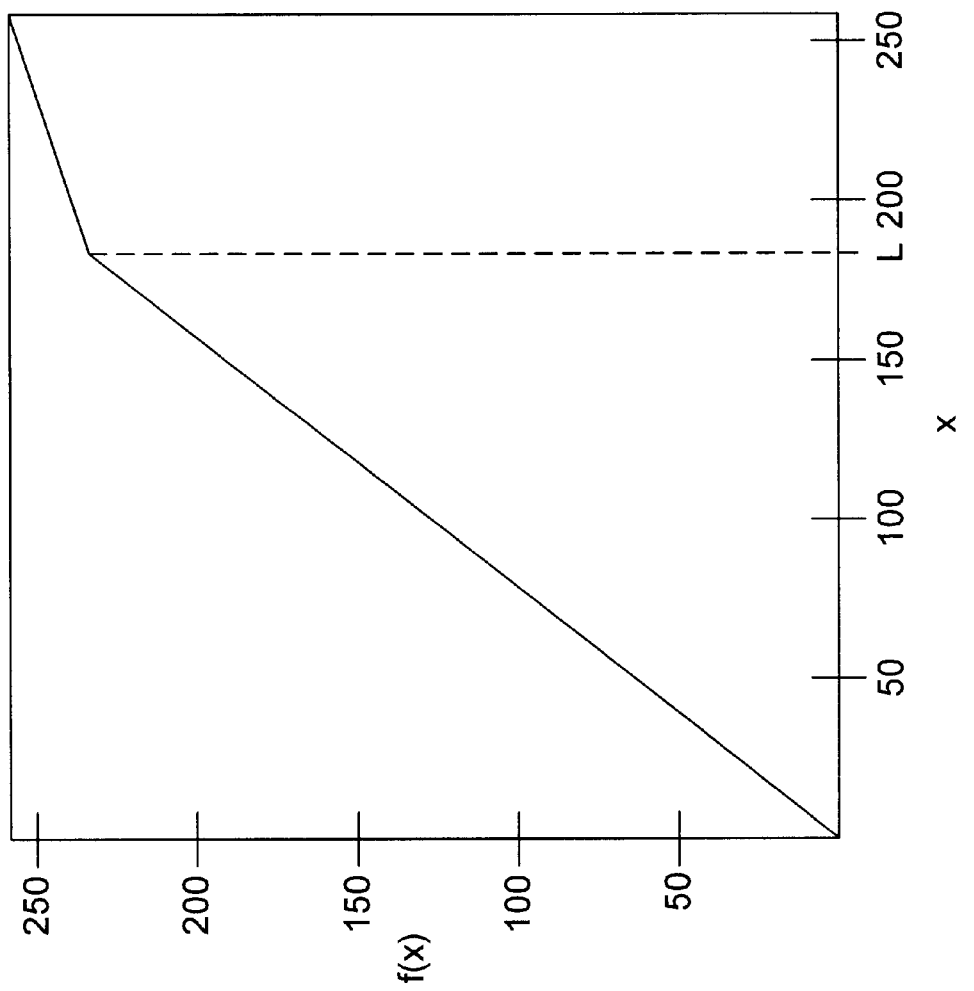
FIG. 3 is a schematic view illustrating the histogram transformation used on the received underlying structure component of FIG. 2.

Conversely, at the receiving or synthesis end, underlying structure component $l^{\wedge}_{n,i,j}$ 36 on channel 37 is input to histogram transformer 83 where optional histogram modification may be performed. The histogram transformation used is nonlinear and has the profile illustrated in FIG. 3. The signal is then operated upon by amplitude warping device 85 which warps the pixel amplitudes. Texture component $t_{n,i,j}$ 38 on channel 39 is operated upon by amplitude warping device 87, which contains logic identical to amplitude warping device 85. Underlying structure component $l^{\wedge}_{n,i,j}$ 36 and texture component $t^{\wedge}_{n,i,j}$ 38 are then summed by adder 89 resulting in a composite structuretexture sequence of frames. This result is passed to the inverse amplitude warping device 91 and supplies output frame $x^{\wedge}_{n,i,j}$ 42 on channel 41 which is then ready for analysis by an ultrasound specialist.

Lowpass filter 55 has a cutoff frequency of $\omega_c = \pi/D_1$. Nonlinear decomposition is then described by the equation $x_{n,i,j} = \psi^{-1}(\psi(l_{n,i,j}) + \psi(t_{n,i,j}))$. This decomposition is equivalently a nonlinear subband decomposition. The amplitude warping device $\psi(\cdot)$ is chosen to be of the form $\psi(x) = \beta x^{\alpha}$. For $\beta = 1$ and $\alpha = 1$, $\psi(\cdot)$ is the identity mapping, the subband analysis is linear and we obtain the additive model. For $\alpha = 0.231$, $\psi(x) \approx \beta \log(x)$ in the range 0 to 255, and we obtain the multiplicative model. The parameter $\beta$ was chosen so that x and $\psi(x)$ have the same dynamic range, i.e. from 0 to 255. The parameter $\alpha$ was chosen empirically to optimize the subjective performance.

Qualitatively, the lowpass component should contain as much useful detail as possible, while keeping the constant cutoff frequency of filter 55. To quantify this criterion, it is desirable to minimize the difference between $l_{n,i,j}$ and $x_{n,i,j}$. Similarly, it is desirable to minimize the energy in texture component $t_{n,i,j}$ 16. This ensures that the amount of information contained in the texture is not significant.

It will be obvious to those skilled in the art that many modifications and variations may be made to the preferred embodiments of the present invention, as set forth above, without departing substantially from the principles of the present invention. For example, many coding techniques can be employed to code and decode the decimated texture component and the underlying structure component. Furthermore, many multiplexing, demultiplexing and transmission techniques can be employed to transmit the coded signal over a low capacity channel such as a conventional telephone line, while still practicing the concepts of the invention, as set forth previously. All such modifications and variations are intended to be included herein within the scope of the present invention, as defined in the claims that follow.

In the claims set forth hereinafter, the structures, materials, acts, and equivalents of all "means" elements and "logic" elements are intended to include any structures, materials, or acts for performing the functions specified in connection with said elements.

The following is claimed:

1. A method for coding a video signal, comprising the steps of:

decomposing a video image into a texture component, said texture component formed by applying an amplitude warping operator to said video image, applying an output of said amplitude warping operator to a highpass filter, and applying an inverse amplitude warping operator to an output of said highpass filter;

decomposing said video image into a underlying structure component, said underlying structure component formed by applying said amplitude warping operator to said video image, applying an output of said amplitude warping operator to a lowpass filter, and applying said inverse amplitude warping operator to an output of said lowpass filter;

decimating said texture component to form a decimated texture component from an original frame rate;

decimating said underlying structure component to form a decimated underlying structure component from an original frame size;

coding said decimated texture component for transmission; and coding said decimated underlying structure component for transmission.

2. The method of claim 1, wherein said texture component is decimated in the temporal domain, and said underlying structure component is decimated in the spatial domain.

3. The method of claim 1, wherein said texture component is decimated in the spatial domain, and said underlying structure component is decimated in the temporal domain.

4. The method of claim 1, further comprising the steps of:

transmitting said coded decimated texture component over a low capacity channel at a variable rate; and transmitting said coded decimated underlying structure component over a low capacity channel at a rate different than that of said coded decimated texture component.

5. The method of claim 1, further comprising the steps of:

generating a synthesized texture frame using a texture synthesis algorithm;

storing a temporally decimated texture frame; and interpolating said decimated texture component by alternating between said synthesized texture frame and said temporally decimated texture frame for temporal interpolation of said decimated texture component.

6. A method for decoding a video signal, comprising the steps of:

reconstructing a coded decimated texture component to form a reconstructed texture component, said reconstructed texture component formed by applying an amplitude warping operator to said coded decimated texture component;

reconstructing a coded decimated underlying structure component to form a reconstructed underlying structure component, said reconstructed structure component formed by applying an amplitude warping operator to said coded decimated underlying structure component;

adding said reconstructed texture component and said reconstructed underlying structure component; and operating on said reconstructed texture component and said reconstructed underlying structure component using an inverse amplitude warping operator.

7. The method of claim 6, wherein said coded decimated texture component is temporally upsampled to an original frame rate and said coded decimated underlying structure component is spatially interpolated to an original frame size.

8. The method of claim 6, wherein said coded decimated texture component is spatially interpolated to an original frame size, and said coded decimated underlying structure component is temporally upsampled to an original frame rate.

9. A computer readable medium having a program for coding a video signal, the program comprising:

first decomposing means for decomposing a video image into a texture component, said texture component formed by applying an amplitude warping operator to said video image, applying an output of said amplitude warping operator to a highpass filter, and applying an inverse amplitude warping operator to an output of said highpass filter;

second decomposing means for decomposing said video image into a underlying structure component, said underlying structure component formed by applying said amplitude warping operator to said video image, applying an output of said amplitude warping operator to a lowpass filter, and applying said inverse amplitude warping operator to an output of said lowpass filter;

first decimating means for decimating said texture component to form a decimated texture component from an original frame rate;

second decimating means for decimating said underlying structure component to form a decimated underlying structure component from an original frame size;

first coding means for coding said decimated texture component for transmission; and second coding means for coding said decimated underlying structure component for transmission.

10. The computer readable medium of claim 9, wherein said first decimating means decimates said texture component in the temporal domain, and said second decimating means decimates said underlying structure component in the spatial domain.

11. The computer readable medium of claim 9, wherein said first decimating means decimates said texture component in the spatial domain, and said second decimating means decimates said underlying structure component in the temporal domain.

12. A computer readable medium having a program for decoding a video signal, the program comprising:

first reconstructing means for reconstructing a coded decimated texture component to form a reconstructed texture component, said reconstructed texture component formed by applying an amplitude warping operator to said coded decimated texture component;

second reconstructing means for reconstructing a coded decimated underlying structure component to form a reconstructed underlying structure component, said reconstructed structure component formed by applying an amplitude warping operator to said coded decimated underlying structure component;

adding said reconstructed texture component and said reconstructed underlying structure component; and operating on said reconstructed texture component and said reconstructed underlying structure component using an inverse amplitude warping operator.

13. The computer readable medium of claim 12, wherein said coded decimated texture component is temporally upsampled to an original frame rate, and said coded decimated underlying structure component is spatially interpolated to an original frame size.

14. The computer readable medium of claim 12, wherein said coded decimated texture component is spatially interpolated to an original frame size, and said coded decimated underlying structure component is temporally upsampled to an original frame rate.

15. A system for coding a video signal, comprising:

first decomposing logic for decomposing a video image into a texture component, said texture component formed by applying an amplitude warping operator to said video image, applying an output of said amplitude warping operator to a highpass filter, and applying an inverse amplitude warping operator to an output of said highpass filter;

second decomposing logic for decomposing said video image into a underlying structure component, said underlying structure component formed by applying said amplitude warping operator to said video image, applying an output of said amplitude warping operator to a lowpass filter, and applying said inverse amplitude warping operator to an output of said lowpass filter;

first decimating logic for decimating said texture component to form a decimated texture component from an original frame rate;

second decimating logic for decimating said underlying structure component to form a decimated underlying structure component from an original frame size;

first coder for coding said decimated texture component for transmission; and second coder for coding said decimated underlying structure component for transmission.

16. The system of claim 15, wherein said first decimating logic decimates said texture component in the temporal domain, and said second decimating logic decimates said underlying structure component in the spatial domain.

17. The system of claim 15, wherein said first decimating logic decimates said texture component in the spatial domain, and said second decimating logic decimates said underlying structure component in the temporal domain.

18. A system for decoding a video signal, comprising:

first reconstructing logic for reconstructing a coded decimated texture component to form a reconstructed texture component, said reconstructed texture component formed by applying an amplitude warping operator to said coded decimated texture component;

second reconstructing logic for reconstructing a coded decimated underlying structure component to form a reconstructed underlying structure component, said reconstructed structure component formed by applying an amplitude warping operator to said coded decimated underlying structure component;

adding logic configured to add said reconstructed texture component and said reconstructed underlying structure component; and logic configured to operate on said reconstructed texture component and said reconstructed underlying structure component using an inverse amplitude warping operator.

19. The system of claim 18, wherein said coded decimated texture component is temporally upsampled to an original frame rate, and said coded decimated underlying structure component is spatially interpolated to an original frame size.

20. The system of claim 18, wherein said coded decimated texture component is spatially interpolated to an original frame size, and said coded decimated underlying structure component is temporally upsampled to an original frame rate.

* * * * *

UNITED STATES PATENT AND TRADEMARK OFFICE
CERTIFICATE OF CORRECTION

PATENT NO. : 5,974,186
DATED : October 26, 1999
INVENTOR(S) : Smith, et. al.

It is certified that error appears in the above-identified patent and that said Letters Patent is hereby corrected as shown below:

Title page, item [57],

In the Abstract, delete "predicament" from line number 8.
Column 1, line 2, between "of" and "and" insert --copending--.
Column 1, line 5, delete "and."
Column 2, line 54, after "end" add --,--.
Column 2, line 63 through column 3, line 3, delete the paragraph "Another aspect of the present invention is a system and method for...according to a motion field."
Column 4, line 46, delete "$I_{n,i,j}$" and substitute therefor --$l_{n,i,j}$--.
Column 5, line 57, between "texture" and "structure" add -- - --.
Column 8, line 18, delete "14" and substitute therefor --14'--.
Column 9, line 19, between "structure" and "texture" add -- - --.
Column 10, line 5, delete "a" and substitute therefor --an--.
Column 10, line 51, between "reconstructed" and "structure" add --underlying--.
Column 11, line 14, delete "a" and substitute therefor --an--.
Column 11, line 51, between "reconstructed" and "structure" add --underlying--.
Column 12, line 12, delete "a" and substitute therefor --an--.
Column 12, line 46, between "reconstructed" and "structure" add --underlying--.

Signed and Sealed this

Fifth Day of December, 2000

Attest:

Q. TODD DICKINSON

*Attesting Officer*  *Director of Patents and Trademarks*